United States Patent [19]

Thomas

[11] Patent Number: 5,736,474
[45] Date of Patent: Apr. 7, 1998

[54] MULTI-STRUCTURE BALLISTIC MATERIAL

[76] Inventor: Howard L. Thomas, 1032 Crestwood St., Auburn, Ala. 36830

[21] Appl. No.: 610,542

[22] Filed: Mar. 6, 1996

Related U.S. Application Data

[63] Continuation-in-part of Ser. No. 36,668, Mar. 25, 1993.
[51] Int. Cl.⁶ .......................................................
[52] U.S. Cl. ................... 442/388; 442/391; 442/392; 442/393; 428/911
[58] Field of Search ............................ 442/382, 387, 442/388, 391, 392, 393; 428/911

[56] References Cited

U.S. PATENT DOCUMENTS 5,102,723  4/1992  Pepin ........................... 428/223

*Primary Examiner*—Christopher Raimund
*Attorney, Agent, or Firm*—Sheldon H. Parker

[57] ABSTRACT

A ballistic resistance multi-structure material having multiple layers. The material has at least one layer of hard surfaced ballistic resistant woven material, at least one layer of ballistic nonwoven material and one layer ballistic nonwoven material with at least one layer of a plurality of deflection devices embedded within. The deflection devices are adjacent one another and have a ballistic deflecting geometric. The path of a bullet is diverted by crushing the structure of the bullet, altering the angle of the path of projection or stopping the penetration of the bullet beyond the layer of multiple geometric shapes. In a further embodiment, for use with lasers, the ballistic deflecting geometric shapes have a reflective surface. A reflective layer can be placed adjacent the layer of geometric shapes, reflecting laser beams away from the user's body.

20 Claims, 2 Drawing Sheets

MULTI-STRUCTURE BALLISTIC MATERIAL

This is a continuation-in-part of copending application Ser. No. 08/036,668 filed on Mar. 25, 1993, pending.

BACKGROUND OF THE INVENTION

1. Field of the Invention

The instant invention relates to a multi-structure ballistic material using a combination of a nonwoven ballistic material, a woven ballistic material and a ballistic nonwoven embedded with geometric deflection devices.

2. Brief Description of the Prior Art

Protective armor dates back before the third millennium B.C. As weapons have increased in accuracy and potency, protective armor has been forced to increase comparably. The most recent protective wear was developed with the advent of artificial fibers which are used to produce soft body armor, generally in the form of vest. Woven fabric plied in layers were able to create a barrier with relative high ballistic resistance compared to the weight of the vest. With the advancement of polymer science, higher strength fibers were developed thereby increasing the strength of the structures. The use of high tenacity Nylon, Kevlar and Spectra dramatically increased the protection per weight of the structure. Presently, the two main types of ballistic resistant fabrics are aramid woven fabrics such as Kevlar and composite Spectra Shield. Aramid is a type of polymer and includes the generic family of Kevlar and Nomex.

Soft body armor is given a protective rating when tested using standard projectiles traveling between 1500 and 1700 feet per second (460 and 520 m/sec). The ballistic limit, V50, represents the velocity at which complete penetration and incomplete penetration are equally likely to occur. The V50 ballistic resistance is an average velocity of six shots. The powder charge is varied to get three partial penetrations and three complete penetrations all in a 125 ft./sec range. The target has an aluminum witness plate six inches behind it. When the projectile penetrates the witness plate, the target is considered completely penetrated. The V50 ballistic resistance rating is based on three complete penetrations and three partial penetrations at projectile velocities within a 125 ft./sec (38 m/sec) range of each other.

Vests using Kevlar are generally constructed of Kevlar 29 or 129 filament yarn from DuPont which is woven into a square construction (sett) of 12.2 threads/cm with 16–24 layers. This produces a vest weighing 1.5 to 2.5 kg with a V50 protective rating of 1500 to 1700 ft./sec (460 to 520 m/sec).

A combination of Kevlar 129 and Spectra Shield has been produced in some vest manufacturing. The lightweight, high strength Spectra Shield is sandwiched between layers of flame resistant, high strength Kevlar, thereby providing the vest with the individual characteristics of each fiber type. Producing these combination vests requires many steps, driving up the cost of production.

SUMMARY OF THE INVENTION

The disclosed ballistic resistance multi-structure material has multiple layers, each having at least one sublayer. At least one layer of a pliable, blended, composite ballistic nonwoven material made of at least two different fibers is used. The nonwoven is blended to lie in close to random orientation within the same layer, with each of the different fibers having different deformation properties. One of the fibers is a thermoplastic characterized by undergoing a phase change within the temperature range produced by the heat generated by the ballistic impact. The other of the fibers is a non-thermoplastic characterized by deformation at a temperature at least 80° C. higher than the temperature of the phase change fiber. The blended fibers are needlepunched to join the fibers, creating a single layer fabric through fiber to fiber friction interlock of the two different fibers. The individual fibers remain movable in relation to one another. The impact of a ballistic object causes the fabric to react by inherent fiber tensile response as an initial resistance to the ballistic impact. Phase change at the fiber interfaces removes energy from the ballistic impact. Fiber movement after phase change at the thermoplastic to non-thermoplastic fiber interface occurs under the retarding influence of viscous melt flow, the input of energy from the ballistic impact generating molten fiber movement. One of the layers of ballistic nonwoven material has at least one layer of a plurality of deflection means embedded therein. Each of the deflection means has a ballistic deflecting geometric shape. The deflection means are in physical contact with one another to transfer and absorb energy along the layers of deflection means. Preferably the layers also include at least one layer of, pliable, or semi-pliable, hard surfaced ballistic resistant woven material, having a warp and filling.

In an alternate embodiment, the ballistic material can have an exterior layer of an inflexible, solid surface material.

In a further embodiment, for use with lasers, the ballistic deflecting geometric shapes have a reflective and/or refractive surface. A reflective layer can be placed adjacent the layer of geometric shapes, reflecting laser beams away from the user's body and back into the layer of geometric shapes.

The ballistic resistant multi-structure material can have multiple layers of at least one layer of ballistic nonwoven material and one layer of multiple geometric shapes embedded in a ballistic nonwoven material.

The initial impact of a ballistic device upon entry into the ballistic resistant multi-structure material is slowed by creating resistance to the device. The energy of the ballistic device is absorbed through at least one layer of ballistic nonwoven material, by causing the fabric to react by inherent fiber tensile response as an initial resistance to the ballistic impact. The energy is removed from the ballistic device through phase change at the fiber interfaces and fiber movement after phase change at the thermoplastic to non-thermoplastic fiber interfaces occurring under the retarding influence of viscous melt flow, generating molten fiber movement. The ballistic device is diverted from its original path by contacting the layer of a plurality of deflection means and absorbing energy of said ballistic device through contact with said ballistic nonwoven. The energy created by the ballistic device is spread horizontally through each layer of the multi-structure material, dissipating at least a portion of the energy prior to the ballistic device penetrating the multi-structure material.

BRIEF DESCRIPTION OF THE DRAWINGS

The advantages of the instant disclosure will become more apparent when read with the specification and the drawings, wherein.

DETAILED DESCRIPTION OF THE INVENTION

Figure 1:
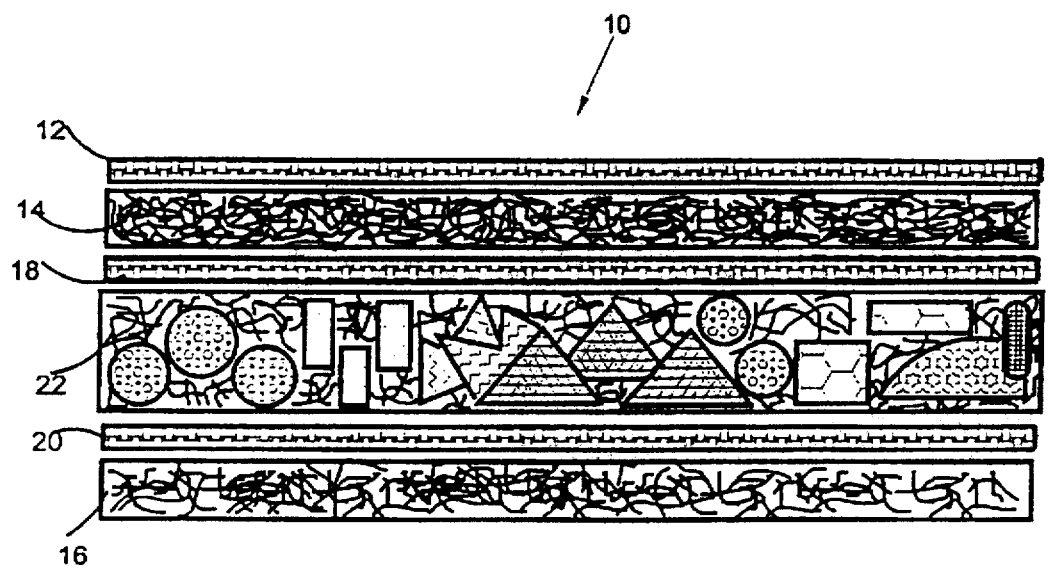
FIG. 1 is a cross sectional view of one embodiment of the multi-layer structure of the instant invention utilizing spheres within the geometric layer.

The invention discloses a ballistic resistant multi-structure material which serves to stop high impact, high energy bullets and other projectiles. For clarity in describing the invention, the following definitions will be d herein:

Ballistic nonwoven is the material disclosed in co-pending application Ser. No. 08/036,668, pending, which is incorporated herein as though recited in full.

Ballistic resistance, as used herein, refers to a resistance to any high energy medium which can enter the body and cause injury. This includes metal bullets, lasers, ice picks, fleshettes, etc.

A layer will refer to one or more sheets, or sublayers, of the same material.

A sublayer will indicate one sheet or unit of material.

Geometric layer will refer to a single layer of nonwoven material having geometric shapes embedded therein.

Hard surface refers to any standard woven ballistic resistant structure.

Solid surface will refer to any resin hardened fibrous composite structure as well as commonly used plate structures, such as steel or ceramic.

Woven refers to a standard ballistic material such as sold under the trademarks Kevlar® and Spectra®.

High caliber bullets have larger diameter and are lower in velocity than many smaller diameter bullets. For example, the 0.45–70 rifle round used since the days of western buffalo hunters travels at approximately 900 feet/second with a muzzle energy of approximately 550 foot pounds. The small diameter bullets, such as the 0.243 Winchester can travel at 2950 feet/second with a muzzle energy of 1932 foot pounds.

Low caliber, high impact or high energy projectiles have a small diameter but are heavy with a high velocity. A 0.243 caliber is long and heavy and will travel at 2950 feet per second. A 0.243 can easily bring down a large buck with only one shot.

Various types of ammunition exist which have specific purposes. In the early history of rifle and pistol technology, projectiles were made solely of soft lead. Such projectiles still exist, such as those used for the former police sidearm, the 0.38 special. By the time of the First World War, Europe had developed several major new armament innovations including the hollow point bullet (know then as the dum-dum), the metal jacketed bullet and the tracer bullet with a burning phosporous coating on its back side. The hollow point bullet is intended to expand in diameter upon impact and destroy much more living tissue than a standard expanding bullet. The metal jacketed bullet is intended to inhibit expansion and penetrate very hard objects such as wood, concrete and even other metals. Tracer bullets were intended to mark a fire path for other soldiers, but were most effectively applied in aircraft warfare, where they ignited the gasoline in airplanes.

Eventually the Geneva Convention outlawed the use of the hollow point bullet in warfare and made the FMJ, or full metal jacket, projectile standard. The objective was to prevent massive damage to victims. Technology eventually defeated the objective of the Geneva Convention with the introduction of a bullet with very low aspect ratio and a rearward located center of gravity. Examples are the 7.62 mm NATO and 7.62 mm Russian rounds. These projectiles are inherently unstable upon contact with a target. They meet the letter of the Geneva Convention regulations, but defy the intent, because they create more damage than was possible with a hollow point bullet by tumbling as they pass through the victim.

Present ballistic resistant fabrics impart tumble to such high velocity projectiles as soon as they exit the vest and enter the victim and actually enhance the instability effect.

Lower velocity projectiles, such as handgun ammunition, were eventually created with the capability of defeating ballistic resistant vests. This was accomplished by reducing the surface coefficient of friction with respect to the ballistic resistant material. Polytetraflorethylene (PTFE), such as sold under the trademark Teflon®, has an extremely low coefficient of friction. An external coating of PTFE creates a projectile capable of penetrating many ballistic resistants. In their present configurations, the ballistic resistant materials provide only surfaces which are advantageous to low friction projectiles.

Fibers are the basis of all textile ballistic structures, and in order to provide the maximum ballistic resistance, the fiber's strength must be utilized in the most effective manner. When a projectile strikes the surface of a fabric, its energy is converted to force when the surface of the projectile makes contact with the surface of the structure. The force of impact upon a ballistic resistant fabric is absorbed along the fiber or yarn axis and at each interlacing point, where it is further dissipated. The dissipation thus occurs through the mechanisms of strain in the fiber itself and through fiber to fiber friction at the points of contact among fiber surfaces, especially at the fiber or yarn crossover points. The energy required for a material to go through a phase change can also serve to absorb or dissipate impact energy.

In a woven fabric, fiber or filament containing yarns contact each other at crossover points known as interlacings. The strain mechanism of energy absorption can be mechanically described by the material tensile behavior, which in very high strength fibers in nearly entirely Hookean in nature, thus primarily reacting as:

$$s = E \times \epsilon$$

where s=stress, or load of force per unit area in the fiber $\epsilon$=strain, or amount of extension of the fiber resulting from the load imposed on it E=the Young's modulus, a material characteristic which is unique to and dependent upon the chemical and physical composition of each material. If the material net cross sectional area is known, stress may be converted force.

The interlacing points require the force of a striking projectile to be further absorbed, because movement of a fiber or yarn along the body of another contacting fiber or yarn can only occur when the force necessary for movement is greater than that of the friction present. Frictional force in an interlaced fibrous structure can be estimated by the equation:

$$F_2 = F_1 e^{\mu \Theta}$$

where $F_2$=the force required to move fibers at the interlaced points $F_1$=the inherent force present within the fabric structure which holds it together e=the Naperian logarithmic base number, a natural constant μ=the material coefficient of friction Θ=the angle through which the fibers or yarns wrap around the surface of each other at interlacing.

Fabrics can be woven or nonwoven. A woven fabric is manufactured from yarns consisting of twisted fibers or assembled filaments running the width and length of the fabric and which are interwoven. A nonwoven is manufactured from fibers which are not assembled together into yarns and which are placed in the fabric structure in various directions. The fibrous web structure can be bonded together using thermal, inherent, chemical or mechanical techniques.

Most woven Kevlar® fabrics exhibit yarn strength translational efficiencies between 60 and 80%, meaning that between 60% and 80% of the impact is dissipated along the fibers.

The translational efficiency is the amount of energy absorbed along the fiber axis. Strength loss is judged by how much force it takes to tear the fabric in a longitudinal or axial direction.

Fiber to fiber friction assists in absorbing energy in all fabric types while utilizing the strain wave velocity of a fibrous system. This mode of impact dissipation is most advantageously used in a nonwoven structure, because large numbers of fiber contact points are present in a nonwoven, and these may be oriented in many different directions in the structure.

Strain wave velocity is the speed at which a fiber or structure can absorb and disperse strain energy. It can be expressed as:

$$v=F/m$$

where v=strain wave velocity

F=force applied to the fiber from the projectile m=linear density expressed as kg/m V can also be expressed as $$v=E/\rho$$

where

ρ=specific gravity of material

By combining the equations, an expression for optimum dissipation of impact energy can be found, as shown by:

$$F=Em/\rho$$

The more impact energy a structure disperses, the more efficient is the energy absorption mechanism. Three reactions occur in a needlepunched structure when a projectile strikes it. The reactions are fiber strain (elongation), fiber movement (slippage) and fiber breakage. The better these features are optimized, the better the ballistic properties of the final fabric. Fiber denier and length are important when considering the fiber to fiber frictional properties within a needle punched structure. Denier is a measurement of fiber fineness defined as the mass in grams per 9000 meters of length. The smaller the denier and greater the length, the greater frictional properties can be generated in the structure. This is because more surface area will be in contact among the fibers when they are small and long. Motion in the presence of enough friction can dissipate energy through the creation of heat. The more friction generated in a structure without catastrophic fiber breakage, the more impact energy can be absorbed. A nonwoven forces the projectile to engage many more fibers upon initial impact than a woven fabric because of the wide dispersion of filaments in the untwisted yarn.

Body heat transfer and vapor transfer is increased in the ballistic nonwoven, as well as the flexibility of the material. The ballistic nonwoven also provides lower production costs because it requires low raw material usage and fewer processing steps.

The two predominant fabrics currently used for ballistic protection are polyaramid filament yarns (Kevlar®) in a woven state, and Spectra Shield®, a composite. Kevlar® vests are generally constructed of Kevlar 29, 49 or 129 filament yarn, woven into a plain weave 31×31 per inch assembly and layered 16 to 24 times, giving a weight of 3.5 to 5.5 pounds, to give the desired V50 ballistic resistance protection of 1500 to 1700 feet per second (460 to 520 meters/second). The vest normally has a thickness of 0.2 to 0.33 inches.

Kevlar® fibers are highly heat resistant, and therefore do not melt from the heat resulting from fiber—fiber or fiber—fragment friction. Kevlar® fibers deform exclusively through the mechanism of fibrillation. The fibers are continually displaced until they lock, and break up to the point when the fabric absorbs the projectile energy or the projectile exits the structure.

The Spectra® fibers deform differently from the Kevlar®. The fibers that are pulled across the surface of another raise the surface temperature of the fiber to the point that it is softened and permanently deformed. Since the Spectra® is heated to the melting point, substantial energy is locally expended at the fiber crossover to produce a phase change in the polyethylene fiber. As the bullet penetrates through the layers, more fibers are pulled across each other at very high rates of speed expending more heat energy by fiber to fiber friction and changes of state. This energy absorbing mechanism produces some of the increase in V50 ballistic resistance values found in the high modulus fiber blend compared to the values encountered with 100% Kevlar.

The multi-structure material set forth herein utilizes the prior art ballistic properties of hard surfaced wovens, and resin impregnated composite and/or solid plate structures. The instant invention dramatically improves the V50 by incorporating layers of ballistic nonwoven and a layer of geometric shapes embedded in ballistic nonwoven. By varying the combinations of these layers, the optimum ballistic resistance can be provided for protection against specific categories of projectiles. The combinations illustrated herein are given as examples only and are not intended to limit the application.

The multi-structure material 10 illustrated in FIG. 1, comprises uses three layers of hard surface woven or composite material 12, 18 and 20, dual layers of ballistic nonwoven and a center layer of ballistic nonwoven embedded with geometric shapes 22. The layers, in order from exterior to interior, are an exterior hard surface layer 12, an initial ballistic nonwoven 14, an interior hard surface 18 layer, geometric layer 22 consisting of geometric shapes embedded in a ballistic nonwoven, a backing hard surface 20 layer and a lining ballistic nonwoven 16 layer. Although one geometric layer 22 is illustrated herein, multiple geometric layers can be used if desired.

The exterior hard surface layer 12 serves to initiate retarding of the projectile's movement and initiate deformation of the projectile surface. As stated heretofore, Spectra® melts at relatively low temperature. Because of this, it is suggested that a flame retardant be used in combination with the Spectra® to prevent burning or melting of the Spectra from the high temperatures associated with a muzzle blast in close proximity to an intended victim. In cases where the end use may require exposure to extremely high energy bullets or projectiles such as 7.62 mm Russian, 7.62 mm NATO, 0.243 caliber or 0.30–06 caliber ammunition, a solid surface material can be substituted or combined with the hard surface material. Since the solid surface material negates the normal flexibility of the multi-structure ballistic material hinges would be required to allow for the armor to bend around the user's body.

The ballistic nonwoven initial layer 14 is the first in several improvements the instant invention has over the standard woven ballistic materials. The nonwoven fibers inherently react to the energy and heat transmitted by the bullet through phase change and fibrillation. These chain reactions draw more and more energy from the bullet as it passes through the layer 14. The impact created by the bullet forces the fibers in the nonwoven layer 14 to move against one another, creating sufficient friction to generate heat and raise the Spectra® fibers above their comparatively low inherent melt point. The fibers absorb the energy concentration present with ballistic impact, dissipating it through the previously described mechanisms of strain, friction and friction-generated heat, which causes the Spectra® fibers to undergo a phase change, that is, melt while they are in contact with the adjacent Kevlar® fibers. The Kevlar®, when struck with a projectile, fibrilates and breaks along the fiber longitudinal axis, further absorbing energy. Since the nonwoven is needlepunched, the blend of fibers is held together by surface contact friction, eliminating bonding materials and allowing for free fiber to fiber movement. When deformation of the projectile is initiated by impact with the first, hard layers, the projectile's path is further diverted by passage through the nonwoven medium. The amount of deformation imparted to the projectile is dependent upon the material composition of the projectile (e.g. FMJ, soft lead, hollow point, etc.) and the composition of the hard layers. The choice of material for the initial layers would depend on the user's assessment of the kind of threat most likely to be faced. In the case of hollow or soft point ammunition, the nonwoven can prevent, or even reverse the intended expansion of the projectile, thereby negating the intended design of the projectile.

The intermediate layer 18 can be used as a optional layer, however it is recommended when higher energy bullets are expected. The intermediate layer 18 is a hard surfaced, woven material similar to the initial layer 12. The intermediate layer 18, however, does not need to have as hard a surface as the initial layer 12 and can be more flexible. The intermediate layer 18 serves to further slow the speed of the bullet as well as absorbing additional energy.

The geometric layer 20 comprises a single, or combination, of geometric shapes embedded in a ballistic nonwoven layer. The geometric shapes are preferably in contact with one another to allow for the expedient transfer of energy from one shape to another. The geometric shapes can be manufactured from steel, polyethylene, or equivalent materials, depending on weight limitations and projectile characteristics which the material is intended to stop.

Alternate shapes provide different results and are, preferably, combined to meet the anticipated needs of the user. Although different results are obtained through the use of specialized shapes, it is not a situation of all or nothing but rather a matter of optimizing the available protection to the user. Therefore, a vest which would stop a 0.22 would also stop a 0.38 special, but not a 7.62 mm Russian. Further, the optimization is applicable on a broad range of criteria and specific intended end use. For example, military forces require a much higher level of protection from anticipated threats than a city policeman, and a policeman needs a higher level of protection than a prison guard.

The use of spherical shapes in the geometric layer 20 allows the lowest probability of an entering projectile striking a surface exactly perpendicular to the surface tangent plane, increasing the probability of the projectile deflecting out of its path. If the spheres are in contact with each other, the projectile impact and deflection create subsequent rotation of the spheres and dissipation of impact energy. After sufficient surfaces have been impacted by the deflecting projectile, it can be turned to a surface geometry which is more advantageous to the retarding action of the ballistic resistant materials. The net effect is similar to hitting a rack of billiard balls with a cue ball at high speed. Energy is transferred to the balls in all directions at once. In specific cases, spherical surfaces of sufficient hardness, embedded in ballistic resistant nonwoven fabric create sufficient rotation and deflection of the projectile to grind the projectile apart. When the geometric shapes are manufactured from a thermoplastic, the heat will cause the surface of the shapes to melt as some of the energy from the bullet is absorbed by the plastic.

The use of pyramids, or other sharp angled shapes, serves to deflect the path of the bullet. Although a bullet shot directly into the geometric layer would not be adequately diverted, the combination of the woven and nonwoven layers prior to entry into the geometric layer absorbs a sufficient amount of the energy to allow the angled geometric shapes to divert the bullet's path. It should also be noted that each geometric shape need not divert the bullet to a great degree as each shape the bullet comes in contact with will continue to divert the path. This is disclosed in further detail hereinafter.

Figure 2:
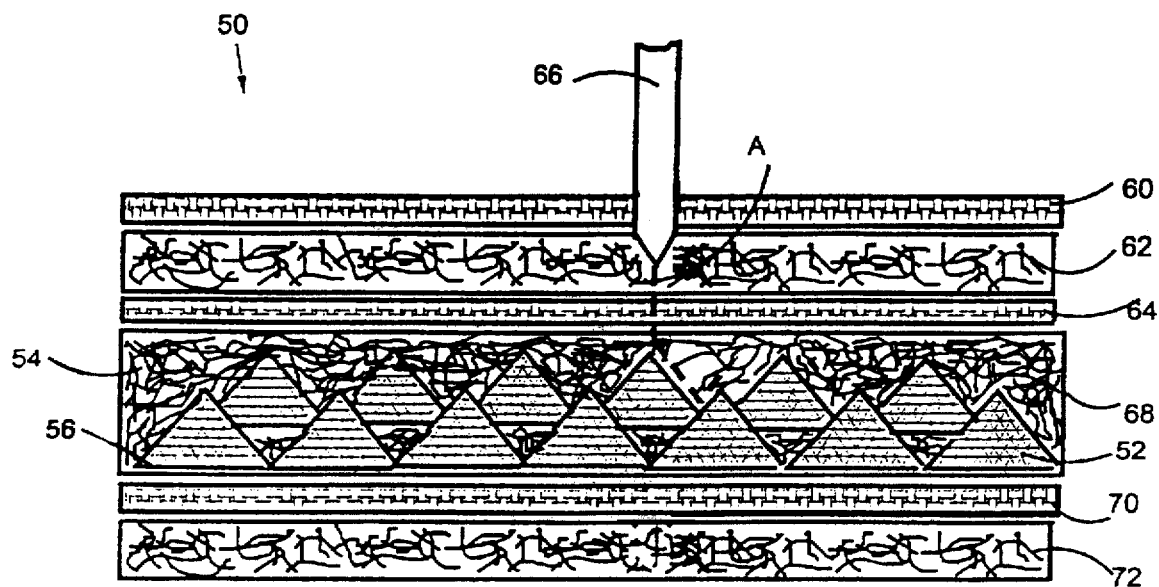
FIG. 2 is a cross sectional view of an alternate embodiment of the multi-layer structure of the instant invention utilizing pyramids within the geometric layer.

In FIG. 2 the geometric shapes are pyramids 52 which are embedded in the ballistic nonwoven 54 with the base 56 of each pyramid 52 in contact with adjacent bases 56. As can be seen herein, the pyramids 52 are placed at different levels within the ballistic nonwoven 54, to allow for further bullet 66 diversion. This configuration optimizes the inherent ballistic characteristics of pointed high speed bullets such as 7.62 mm Russian, 7.62 mm NATO, 0.243 caliber or 0.30–06 caliber ammunition to defeat the projectile. The tops of the pyramids 52 are pointed toward the exterior of the multi-structure material 50. The bullet 66 enters the multi-structure material 50 and is slowed by the initial hard surface layer 60. Upon entering the ballistic nonwoven layer 62, additional energy is dissipated by the phase change and deformation, thereby slowing the bullet 66 further. An intermediate hard surface layer 64 further slows and diverts the path of the bullet 66. The chain reaction within the nonwoven layer 62 is extremely rapid and the longer the bullet 66 stays within the nonwoven layer 62, the more energy is drawn from the bullet 66 to feed the phase change of the nonwoven layer 62. Upon contact with the pyramid 52, the bullet 66 takes the path of least resistance, following Path A along the side of the pyramid 52 until it comes in contact with an adjacent pyramid 52. The bullet 66 continues to expend energy as it works its way through the nonwoven encased pyramids 52. Once through the geometric shape layer 68 the bullet 66 has slowed and turned, thereby entering the backing layer 70 of woven ballistic material at an angle. If the bullet 66 is able to penetrate the backing layer 70, it enters the final interior layer 72 of ballistic nonwoven. At this point, the bullet 66 has slowed and is approaching the body at an angle rather than head on. The angle also forces the bullet 66 to present additional surface to the nonwoven final interior layer 72 as well as remaining in the final interior layer 72 for a longer period of time. The additional surface and time allow the nonwoven final interior layer 72 greater energy absorption from the projectiles. Depending on the initial entry speed, the number of layers of nonwoven and woven ballistic resistant fabric present and the projectile material, the projectile can be stopped or disintegrated in its transit through the layers present.

Figure 3:
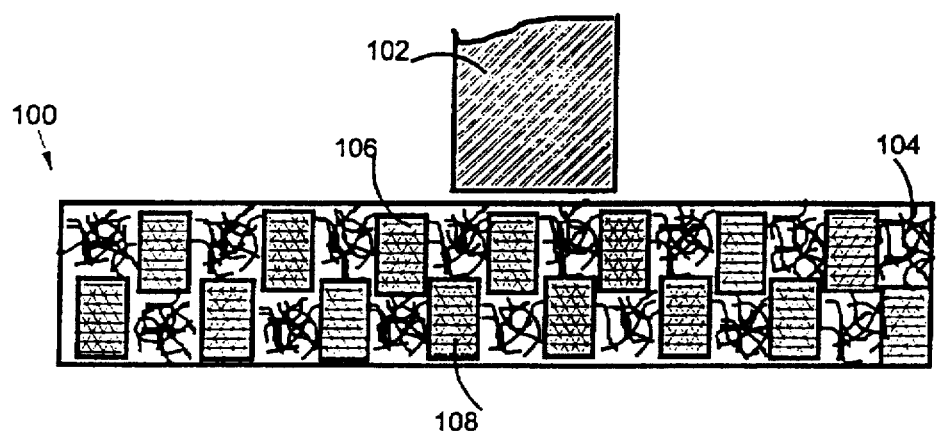
FIG. 3 is a cross sectional view of an alternate embodiment of the multi-layer structure of the instant invention utilizing rectangular polygons within the geometric layer.

In instances where the intent is to stop a blunt nosed bullet, a polygon, such as square or rectangle solid is optimal. Although only a rectangular polygon is illustrated and described herein, any flat surface polygon which provides the desired resistance can be incorporated. Upon initial impact, the blunt nose of the bullet 102 of FIG. 3, cannot easily slide between the interlacings of the woven structure, but rather the broad nose contacts a greater number of threads, thereby meeting more resistance. Once through the woven layer, the blunt nose 102 encounters the nonwoven initial layer. The blunt nosed bullet 102 presents a large surface area to the nonwoven layer, thereby feeding the deformation chain reaction. The polygon configuration lowers the velocity and in many instances, stops the bullet head on. As can be seen by FIG. 3, the rectangular polygons 106 and 108 are placed at two levels. The upper level 106 encounters the initial impact of the bullet 102 with the force of the bullet 102 driving the rectangular polygons 106 downward into the nonwoven 104. The force of impact on the rectangular polygons 106 and bullet 102 causes the surrounding nonwoven 104 to undergo phase change, thereby drawing the energy from the bullet 102. As the rectangular polygons 106 are driven downward, they are also contacted by rectangles 108 which transmit energy along the rows of rectangular polygons 106. For sufficiently densely packed rectangular polygons or combinations of rectangular polygons before a layer of spheres, the projectile is completely stopped, and energy is dissipated away from the wearer at a right angle to the path of the projectile. The impact of the bullet 102 against the rectangles 106 and 108 causes the tip of the bullet to splay out providing an even wider, and ragged, surface to present to the nonwoven 104.

A type of shotgun ammunition which can easily be purchased contains a lead plug with a steel rod embedded therein. The weight of the lead plug knocks the victim down and the steel rod penetrates the plug at the end of the projectile to enter the victim's body, penetrating prior art vests. The multi-structured material of the instant invention will, at the least, inhibit direct penetration of the steel rod and, at the optimum, completely stop the steel rod. The ballistic nonwoven serves to dramatically slow sharp objects, such as the steel rod, due to the overlapping of the randomly placed fibers. The geometric shape layer will serve to divert the steel rod from its direct path. If the force of the steel rod is sufficient for it to find its way through the geometric shape, it will be traveling at an angle from the original path. The nonwoven final internal layer further slows and diverts the path of the steel rod. The amount of penetration is dependent upon the caliber, shape and hardness of the bullet and upon the speed of engagement with the ballistic resistant structure.

Figure 5:
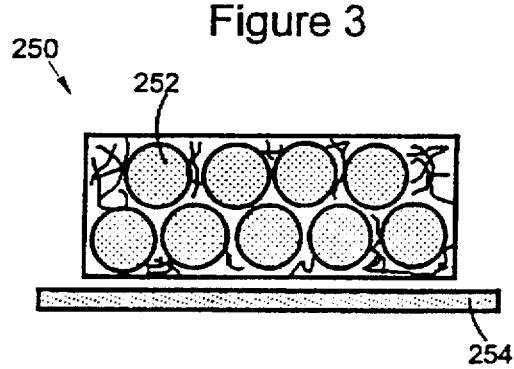
FIG. 5 is a cross sectional view of an alternate embodiment of the multi-layer structure of the instant invention utilizing highly reflective spheres within the geometric layer in combination with a reflective layer.
Figure 4:
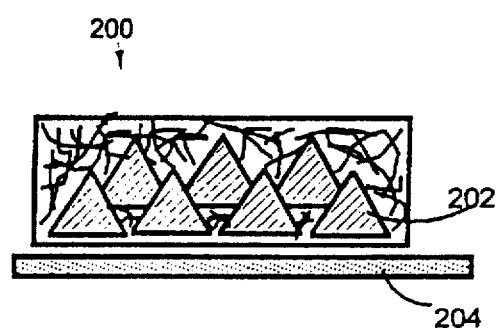
FIG. 4 is a cross sectional view of an alternate embodiment of the multi-layer structure of the instant invention utilizing crystalline pyramids within the geometric layer in combination with a reflective layer.

Lasers are expected to be the next generation of weapons. To counter the laser and provide protection for the wearer, the instant invention can be adapted through the use of reflective and refractive materials. Lasers are, as concentrated light beams, designed to cut through any material. The only way to divert the cutting action of a laser beam is to change its path through reflection. Refraction serves to "dilute" the intensity of the beam. As illustrated in FIG. 5, highly polished spheres 252, in combination with a reflective material 254, is used to reflect a laser beam away from the user's body. The use of crystalline materials in the pyramids 202 of FIG. 4, in combination with the reflective coating 204, will cause the laser beam to reflect and refract within the crystalline pyramids 202 and reflective coating 204, preventing the laser from coming in contact with the user's body. Light radiation from the laser would be reflected from a polished spherical surface to the extent that the surface is smooth and not light absorbent. Where materials are present which are thermoplastic, the laser radiation would be absorbed in the frequencies appropriate to the molecular composition and configurations present and induce heating, phase change and decomposition. Decomposition rather than fibrillation occurs directly in nonthermoplastic materials analogous to the effect noted in kinetic energy weapons impacting on such materials. Although the net effect would be destructive to the protective material, the protective material prevents injury to the intended victim by absorbing the radiant energy rather than allowing it to strike the victim. Although pyramids are illustrated herein, other geometric shapes, as known in the art, which heighten light reflection and refraction, can be incorporated.

Optimum results are achieved by combining both polygons and spheres within the geometric layer. The combination of shapes can be either in separate sublayers or in homogeneous mixtures with each other.

TESTING PARAMETERS

All tests utilized 9 mm, 115 grain, copper jacketed ammunition fired from a distance of five (5) feet using a European police issue handgun. The 12"×12"×0.75 samples were placed against a soft clay backing to assess deformation of the material caused by the impact.

EXAMPLE I

A multi-structure material was formed of five (5) layers of blended nonwoven 54. The geometric layer 56 consisted of steel spheres embedded in a layer of ballistic nonwoven. A third layer 58 consisting of five (5) sub-layers of ballistic nonwoven were used adjacent the target backing.

Three rounds of ammunition were fired into the multi-structure material 50. The bullet entered the nonwoven layer 54, at which it was slowed. Upon entering the geometric layer 56, the bullet impacted one of the spheres, was deflected and caused rotation and displacement of the spheres within the structure; the spheres were surrounded by ballistic resistant nonwoven. Movement of the impacted sphere/spheres created subsequent rotation in each subsequent contiguous sphere, so that rotation was imparted to all the spheres while the bullet was continually being deflected. In this Example, the 9 mm bullets were totally disintegrated in the geometric layer and no further penetration occurred. Bullet fragment remains consisted of pieces of thin copper covering sheet fragments and lead powder fragments. The force created by the bullet was spread throughout the sample first by the initial nonwoven layers, then by the rotating spheres and finally by the last layers of nonwoven. Upon removal of the test material from the clay backing, the back face deformation was indeterminable, the force of the impact having been transversely redirected.

EXAMPLE II

A multi-structure material was formed similar to that in Example I, except that the geometric layer consisted of irregular, random geometry polygons of polyethylene. Two rounds of 9 mm ammunition were fired into the sample. The projectiles were slowed in the first nonwoven layer. Upon entry into the irregular polyethylene polygon layer, the irregular geometric surfaces deflected the bullets' path and dispersed energy to contiguous polygons and to the surrounding nonwoven material. Evidence of phase change of the irregular polyethylene polygons resulting from the transfer of energy from the projectile was also present. Each bullet was stopped in the geometric layer with slight penetration into one fabric sheet of the second nonwoven layer by both irregular polyethylene polygons and by the bullets. The bullets remained intact after being stopped, but large surface deformations were present in the tip regions of the bullets. Fabric back face deformation was 3–4 mm in depth and distributed over a 30 mm radius.

EXAMPLE III

A multi-structure material was formed as in the previous Examples, however irregular polygons of polycarbonate material were used in the geometric layer rather than the polyethylene. Two rounds of ammunition were fired into the sample, passing completely through the entire multi-structure material.

As can be seen from Example III, the materials which are used cannot be randomly chosen. Polycarbonate has a much higher melting point than polyethylene. It is believed that the failure of polycarbonate is due to this high melting point, which negates any phase change. Thus, the bullet simply pushes through the polygons rather than being caught up within the phase change characteristic of the polyethylene.

The ballistic nonwoven, in combination with a hardfaced woven, can be used for leggings and sleeves to compliment a vest as disclosed herein. Although the ballistic nonwoven, hardfaced woven combination will not be as effective in preventing penetration high impact ammunition at close range, it will prevent penetration of lower impact bullets. Further, it will minimize damage received from a high impact bullet, possibly preventing a victim from bleeding to death from a leg or arm wound.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A ballistic resistant multi-structure material having multiple layers, each of said multiple layers comprising at least one sub-layer, wherein:
   at least one of said multiple layers is a ballistic needlepunched nonwoven combination of at least two types of fibers, wherein one of said types of fibers is capable of undergoing a phase change in the presence of ballistic energy and the other of said types of fibers is capable of undergoing fibrillation in the presence of ballistic energy, and
   at least one of said multiple layers is a sheet of ballistic resistant nonwoven material comprising at least one layer of a plurality of shape deflection means, each of said deflection means having a ballistic reflecting geometric shape and being embedded proximate to one another within said sheet in sufficient numbers to substantially cover the area of said sheet.

2. The ballistic material of claim 1 further comprising at least one layer of hard surfaced ballistic resistant material.

3. The ballistic material of claim 2 wherein said plurality of deflection means are polyhedrons selected from the group consisting of hollow steel spheres, pyramids, irregulars configurations and rectangles.

4. The ballistic material of claim 2 wherein said plurality of deflection means are a thermoplastic material.

5. The ballistic material of claim 2 wherein said plurality of deflection means are contiguous with one another.

6. The ballistic material of claim 2 wherein said plurality of deflection means divert the path of a bullet through crushing said bullet.

7. The ballistic material of claim 2 wherein said plurality of deflection means divert the path of a bullet through altering the angle of the path of said bullet.

8. The ballistic material of claim 2 wherein said plurality of deflection means stop the penetration of a bullet beyond said layer of plurality of deflection means.

9. The ballistic material of claim 2 further comprising an exterior layer of a inflexible, solid surface material.

10. The ballistic material of claim 1 wherein said plurality of deflection means are polyhedrons selected from a group consisting of hollow steel spheres, pyramids, irregulars configurations and rectangles.

11. The ballistic material of claim 1 wherein said plurality of deflection means have a reflective surface.

12. The ballistic material of claim 1 wherein said plurality of deflection means have a refractive surface.

13. The ballistic material of claim 1 further comprising a reflective layer, said reflective layer being adjacent said at least one layer of a plurality of deflection means, reflecting laser beams away from the user's body and back into said plurality of deflection means.

14. The ballistic material of claim 1 wherein said plurality of deflection means are a thermoplastic material.

15. The ballistic material of claim 1 wherein said plurality of deflection means are contiguous one another.

16. The ballistic material of claim 1 wherein said plurality of deflection means divert the path of a bullet through crushing said bullet.

17. The ballistic material of claim 1 wherein said plurality of deflection means divert the path of a bullet through altering the angle of the path of said bullet.

18. The ballistic material of claim 1 wherein said plurality of deflection means stop the penetration of a bullet beyond said at least one layer of a plurality of deflection means.

19. A ballistic resistant multi-structure material having multiple layers, each of said multiple layers comprising at least one sublayer, said layers being:
   at least one layer of hard surfaced ballistic resistant material, said hard surfaced ballistic resistance material being a flexible fabric of at least one ballistic resistant fiber;
   at least one layer of ballistic nonwoven material, said ballistic nonwoven being a flexible, blended, nonwoven composite fabric of at least two different fibers, blended to lie in random orientation within the same sublayer, each of said at least two different fibers having different deformation properties, one of said at least two types of fiber being a thermoplastic characterized by undergoing a phase change within the temperature range produced by the heat generated by the ballistic impact and the other of said at least two types of fibers being a non-thermoplastic characterized by deforming at a temperature at least 80° C. higher than the temperature of said phase change, said blended fibers being needlepunched to join said fibers, creating a single sublayer fabric through fiber to fiber friction interlock of said at least two different fibers, in which individual fibers of said at least two different fibers are movable in relation to one another, and impact of a ballistic object causes said fabric to react by inherent fiber tensile response as an initial resistance to the ballistic impact, phase change at the fiber interfaces removes energy from said ballistic impact and fiber movement after phase change at the thermoplastic to non-thermoplastic fiber interface occurs under the retarding influence of viscous melt flow, the input of energy from the ballistic impact generating molten fiber movement;

at least one layer of ballistic nonwoven material having at least one layer of a plurality of deflection means embedded therein, each of said deflection means having a ballistic deflecting geometric shape, each of said plurality of deflection means being proximate with a plurality of deflection means to transfer and absorb energy along the layer of said deflection means.

20. A method of resisting the penetration of a ballistic device, said method comprising placing a ballistic resistant multi-structure material in the path of said ballistic device, said multi-structure ballistic material comprising:

at least one layer of a flexible, hard surfaced ballistic resistant material, said hard surfaced ballistic resistant material comprising at least one ballistic resistant fiber;

at least one layer of ballistic nonwoven material, said ballistic nonwoven being a flexible, blended, nonwoven composite fabric of at least two different fibers, blended to lie in random orientation within the same layer, each of said at least two different fibers having different deformation properties, one of said at least two types of fiber being a thermoplastic fiber capable of undergoing a phase change within the temperature range produced by the heat generated by the impact of said ballistic device and the other of said at least two types of fiber being a non thermoplastic fiber which deforms at a temperature at least 80° C. higher than the temperature of said phase change, said blended fibers being needlepunched, creating a single layer fabric through fiber to fiber friction interlock of said at least two different fibers, in which individual fibers of said at least two different fibers are movable in relation to one another; and at least one layer of a ballistic nonwoven material comprising at least one layer of a plurality of deflection means embedded therein, each of said deflection means having a ballistic deflecting geometric shape, each of said plurality of deflection means being contiguous with said remaining deflection means to transfer and absorb energy along the layer of said deflection means;

wherein, upon impact with the ballistic resistant material, the ballistic device is slowed by the at least one layer of hard surfaced ballistic resistant woven material;

the energy of said ballistic device is at least partially absorbed by the at least one layer of ballistic nonwoven material due to: 1) the inherent fiber tensile response as an initial resistance to the ballistic impact, 2) the phase change at the fiber interfaces and 3) the fiber movement after the phase change has occurred at the thermoplastic to non-thermoplastic fiber interfaces, which movement occurs under the retarding influence of viscous melt flow, generating molten fiber movement; and wherein the ballistic device is diverted from its original path by said at least one layer of a plurality of deflection means and the remaining energy of said ballistic device is at least partially absorbed through contact with said ballistic nonwoven within which the deflection means are embedded;

wherein the energy created by said ballistic device is spread horizontally through each of said layers of said multi-structure material thereby dissipating at least a portion of said energy prior to said ballistic device penetrating said multi-structure material.

* * * * *